United States Patent
Hissen et al.

(10) Patent No.: US 7,363,563 B1
(45) Date of Patent: Apr. 22, 2008

(54) SYSTEMS AND METHODS FOR A BUILT IN TEST CIRCUIT FOR ASYNCHRONOUS TESTING OF HIGH-SPEED TRANSCEIVERS

(75) Inventors: Jurgen Hissen, Port Moody (CA);
Brett Clark, Orefield, PA (US);
Stephen Hiroshi Dick, Coquitlam (CA); Chris Siu, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 505 days.

(21) Appl. No.: 11/005,465

(22) Filed: Dec. 6, 2004

Related U.S. Application Data

(60) Provisional application No. 60/527,166, filed on Dec. 5, 2003.

(51) Int. Cl.
*G01R 31/28* (2006.01)
*G06F 11/00* (2006.01)
*H03L 7/00* (2006.01)

(52) U.S. Cl. .................. 714/733; 714/712; 714/744; 327/144

(58) Field of Classification Search ........... 714/733, 714/712
See application file for complete search history.

(56) References Cited

U.S. PATENT DOCUMENTS 5,394,106 A  2/1995  Black et al.
5,554,945 A * 9/1996  Lee et al. .................... 327/105
5,793,822 A  8/1998  Anderson et al.
5,826,182 A  10/1998 Gilbert
5,835,501 A  11/1998 Dalmia et al.
6,167,103 A  12/2000 Hardin
6,285,197 B2 * 9/2001  Walker ....................... 324/603
6,397,042 B1  5/2002  Prentice et al.
6,552,619 B2  4/2003  Shastri
6,597,212 B1  7/2003  Wang et al.
6,900,681 B2 * 5/2005  Takano ....................... 327/175

OTHER PUBLICATIONS

U.S. Appl. No. 10/998,090, Ferguson et al.
Laquai, Bernd, et al., *Testing Gigabit Multilane SerDes Interfaces with Passive Jitter Injection Filters*, IEEE International Test Conference (ITC) Proceeding (2001 : Baltimore, MD.) pp. 297-304.
Yee, Ah-Lyan, et al., *An Integratable 1-2.5Gbps Low Jitter CMOS Transceiver with Built in Self Test Capability*, IEEE Symposium on VLSI Circuits (1999: Kyoto, Japan), pp. 45-46.
Keezer, D.C. et al., *Test Support Processors for Enhanced Testability of High Performance Circuits*, IEEE International Test Conference (ITC) Proceedings (1999: Atlantic City, N.J.) pp. 801-809.

* cited by examiner

*Primary Examiner*—Jacques Louis-Jacques
*Assistant Examiner*—John J. Tabone, Jr.
(74) *Attorney, Agent, or Firm*—Knobbe Martens Olson & Bear LLP

(57) ABSTRACT

Methods and apparatus provide a transceiver, such as a serializer/deserializer device (SerDes), with enhanced built-in self test (BIST). A built-in self test circuit is provided that decouples a clock signal used for receiving data from a clock signal used in transmitting data. This permits data tracking circuitry of a receiver to be efficiently tested with a relatively simple loop back test.

27 Claims, 15 Drawing Sheets

SYSTEMS AND METHODS FOR A BUILT IN TEST CIRCUIT FOR ASYNCHRONOUS TESTING OF HIGH-SPEED TRANSCEIVERS

RELATED APPLICATION

This application claims the benefit under 35 U.S.C. § 119(e) of U.S. Provisional Application No. 60/527,166, filed Dec. 5, 2003, the entirety of which is hereby incorporated by reference.

BACKGROUND

1. Field of the Invention

The invention generally relates to circuits and methods for built-in self tests (BISTs).

2. Description of the Related Art

Intra-system digital data transmission techniques over backplanes and other transmission mediums have migrated from the use of relatively wide data busses with many data lines to the use of high-speed serial links with relatively few data lines. The serial approach can provide the same or greater aggregate bandwidth while simplifying the backplane design by eliminating a great deal of routing congestion and the need for trace length matching. For example, as illustrated in FIG. 1, a common implementation will use a serializer 102 at the transmit end of the link to convert wide bus data 104 into equivalent high-speed serial data 106, and a deserializer 108 at the receive end of the link to convert back to wide bus data 110 for further processing. For full-duplex operation with unidirectional links, both serializer and deserializer operations can be provided at both ends of the backplane, and fully integrated serializer/deserializer (SerDes) devices are widely available from many integrated circuit (IC) vendors.

FIG. 2 illustrates a conventional SerDes transceiver 200. In a normal operational mode, data that is transmitted by the SerDes transceiver 200 is driven onto a transmission line 202 out of a transmitter amplifier (TX) 204. Data that is received by the SerDes transceiver 200 is recovered by a receiver front end (RX) 206. The transmitter data path performs a serializing function through a parallel-in, serial-out (PISO) circuit 208. The parallel-in, serial-out (PISO) circuit 208 is driven by a serial clock provided by the clock synthesis unit (CSU) 210. The receive data path performs a de-serializing function through a serial-in, parallel-out (SIPO) circuit 212. A sampler circuit 214 determines whether the data is a logic zero or a logic one. Both the sampler circuit 214 and the serial-in, parallel-out (SIPO) circuit 212 are driven by a clock recovery unit 216. The clock recovery unit 216 takes as its inputs, both the clock synthesis unit (CSU) serial clock and the incoming data from the receiver front end (RX) 206.

FIG. 3 illustrates a data eye representation of digital data transitions for a serial data waveform observed by the receiver front end (RX) 206. A data eye corresponds to superimposed waveforms for binary bits of "0" and "1" within a bit period. The upper and lower horizontal lines represent the levels of logic ones and zeroes respectively. The diagonal lines represent transitions between logic zeroes and ones. A challenge in recovering data in high-speed waveforms is to place the sampling clock in the center of the data eye. If sampling occurs over a boundary, a logic bit can be misinterpreted, resulting in an error.

The sampler circuit 214 is to strobe the voltage levels of the incoming RX data at a time prescribed by the sampling clock. When the data voltage is higher than a given threshold, the sampler circuit 214 provides a logic one as an output to the serial-in, parallel-out (SIPO) circuit 212. When the data voltage is lower than a given threshold, the sampler circuit 214 provides a logic zero as an output.

FIG. 4 illustrates an example of receive data and a relatively well-aligned sampling clock signal. The RX data is sampled near the center of the data eye and the likelihood of bit errors is relatively low or minimized.

FIG. 5 illustrates an example of receive data and a relatively poorly-aligned sampling clock signal. The frequency of the RX data stream is slightly offset from the frequency of the sampling clock. For data bits D1, D2 and D3, the sampling point is sufficiently close to the center of the data eye that the likelihood of bit errors is relatively small or minimized. However, for data bits D4 and D5, the sampling point is close to the data transition boundary and the likelihood of bit errors is relatively high. At sampling edge S6, the strobe point has moved toward the center of data bit D7 and illustrates an example where the data and the clock are out of synchronization.

In real-world applications, incoming data is typically not well aligned to the serial clock. For example, there can be a static frequency offset between the serial clock and the data frequency. In addition, the data signal can have jitter, which is a time-varying frequency offset. Frequency offsets and jitter occur in varying degrees depending on the nature of the system.

Returning now to FIG. 2, the clock recovery unit 216 tracks the phase of the incoming data edges. The timing of the data edges is compared against the timing of the serial clock supplied by the clock synthesis unit (CSU) 210. If the phase of the data edge leads or lags the phase of the serial clock edge, the clock phase for the sampler circuit 214 is adjusted so that the sampler circuit 214 strobes the incoming RX data well centered to the data eye.

During production test, the full functional path of a SerDes device should be exercised to verify fault-free operation. The transmit data path of the SerDes device is exercised by sending high-speed data traffic out of the transmitter. The receive data path is exercised by receiving high-speed data traffic. One approach to functional testing has been to source and receive data directly from the automated test equipment (ATE) to the device under test (DUT). However, this approach is relatively impractical at relatively-high operating frequencies or data rates.

FIG. 6 illustrates a conventional SerDes device in a loopback configuration for test. A loopback path 602 operatively couples the transmitter amplifier (TX) 204 to the receiver front end (RX) 206. During a test mode, pseudo-random bit stream (PRBS) data is operatively coupled to the transmit path via the transmitter multiplexer (TX MUX) 604. The data is recovered by the receive data path and is provided to the PRBS monitor to check for bit errors. The presence or absence of bit errors (or the frequency of the bit errors) is used to make the pass/fail decision. While illustrated in the context of PRBS, other data patterns can be used, the selection of which will be readily determined by one of ordinary skill in the art based on the requirements of the device under test (DUT).

One drawback to using a loopback test with a conventional SerDes is that the receive data is clocked at the same rate as the transmitter data, i.e., the receive data and the transmit data are frequency locked. Accordingly, the tracking of incoming data with a frequency offset is not a function of the receiver that is exercised with a conventional SerDes and loopback test. Disadvantageously, such frequency offsets can exist in the end-user's application. Fault coverage of the receiver of the SerDes device for the loopback mode can be inadequately tested.

One relatively costly and impractical way to more adequately test a SerDes device is to force a receiver to track a jittered data waveform. See U.S. Pat. No. 5,835,501 to Dalmia, et al., and U.S. Pat. No. 5,793,822 to Anderson, et al., the disclosures of which are incorporated by reference herein in their entirety. Also, see Laquai, Bernd, et al., *Testing Gigabit Multilane SerDes Interfaces with Passive Jitter Injection Filters*, IEEE International Test Conference Proceedings (2001 Baltimore, Md.) pgs. 297-304. During production test, the device under test (DUT) is configured to loop jittered data out of the transmitter and into the receiver. If the receiver is unable to track the jittered data, the bit error rate increases, and the device is deemed faulty.

A jittered data signal can be applied by external test equipment such as a bit error rate tester (BERT) for production tests, but this method is costly and does not scale well to relatively high-channel count devices. By following a design for test (DFT) approach, a circuit for jitter generation can be incorporated into the device under test (DUT). Having a jitter generator on board the device is an advantage not only in production test but also in system tests. Advantageously, the jitter generator can be configured for test-mode operation and send jittered data through the system, thereby reducing the need for a BERT.

One approach is to build test features onto the hardware of the automated test equipment (ATE). See Keezer, D. C. et al. "Test Support Processors for Enhanced Testability of High Performance Circuits", IEEE International Test Conference (1999: Atlantic City, N.J.) pgs. 801-809. One disadvantage to modifying automated test equipment (ATE) is that the hardware is expensively tailored specifically for each device under test. In addition, since the test features are provided in the automated test equipment (ATE) and not in the SerDes device itself, the test features are not available to an end user.

One approach of inducing frequency offsets between the transmitter and receiver is to introduce a phase interpolator into the transmit clock path. See Yee, Ah-lyan, et al., *An integratable 1-2.5 Gbps Low Jitter CMOS Transceiver with Built in Self Test Capability*, IEEE Symposium on VLSI Circuits (1999: Kyoto, Japan) pgs. 45-46, and U.S. Pat. No. 6,397,042 to Prentice, et al., the disclosure of which is hereby incorporated by reference herein.

SUMMARY OF THE INVENTION

High-speed data communications devices, such as SerDes transceivers experience frequency offsets between receive data and transmit data in end-user applications. In an end-user application, two SerDes devices communicate over two different circuit boards driven by two different reference clocks. Prior techniques of testing high-speed devices are inadequate. It is cost prohibitive to specifically adapt hardware for automated test equipment (ATE) to specific devices. Many conventional loopback tests do not test receiver tracking of received data that is asynchronous to a clock signal. Advantageously, embodiments provide decoupling of clock signals used for transmitting data and for receiving data, thereby testing receiver tracking of asynchronous data. Further advantageously, embodiments maintain the jitter performance of the high-speed communications device and do not add jitter to the transmitted data during a normal operational mode.

One embodiment is a built-in self test (BIST) circuit for a data transceiver, where the BIST circuit includes: a clock synthesis unit (CSU) having a first clock signal as an output; a parallel-in, serial-out (PISO) circuit configured to receive parallel data and to generate serial data, where a data rate of the serial data corresponds to a serial clock frequency provided to the PISO circuit via a clock signal input; and a multiplexer having at least a first input, a second input, and an output, where the first input is coupled to the first clock signal from the clock synthesis unit (CSU), where the second input is coupled to a second clock signal from an asynchronous clock source, where the output of the multiplexer is coupled to the clock signal input of the PISO circuit, where the multiplexer provides the first input to the clock signal input of the PISO circuit when the data transceiver is in a normal mode and provides the second input to the clock signal input of the PISO circuit when the data transceiver is in a test mode.

One embodiment is a phase interpolator, where the phase interpolator includes: a first mixer with inputs coupled to a first phase of an input clock signal and to a first weight; a second mixer with inputs coupled to a second phase of the input clock signal and to a second weight; a first summing circuit with inputs coupled to outputs of the first mixer and the second mixer; a first duty cycle correction circuit with an input coupled to an output of the first summing circuit; a third mixer with inputs coupled to the first phase of the input clock signal and to the second weight; a fourth mixer with inputs coupled to the second phase of the input clock signal and to a complement of the first weight; a second summing circuit with inputs coupled to outputs of the third mixer and the fourth mixer; and a second duty cycle correction circuit with an input coupled to an output of the second summing circuit.

One embodiment is method in a data transceiver of testing tracking of a receiver, where the method includes: in a normal mode, referencing timing of data bits of an output of a transmitter of the data transceiver to a first clock signal; in a test mode, referencing timing of the data bits of the output of the transmitter to a second clock signal, where the second clock signal is asynchronous to the first clock signal; looping back the output of the transmitter to the receiver; using a third Clock signal that is synchronous to the first clock signal and asynchronous to the second signal as a timing reference for the receiver; and monitoring an output of the receiver for bit errors.

BRIEF DESCRIPTION OF THE DRAWINGS

These drawings and the associated description herein are provided to illustrate embodiments and are not intended to be limiting.

DETAILED DESCRIPTION OF EMBODIMENTS

Although particular embodiments are described herein, other embodiments, including embodiments that do not provide all of the benefits and features set forth herein, will be apparent to those of ordinary skill in the art. In addition, while generally described in the context of a SerDes device, it will be understood by the skilled practitioner that the principles and advantages described herein are applicable to any device with a clock recovery unit (CRU). In addition, the ability to produce jittered waveforms is useful not only for loopback test of a device on automated test equipment (ATE), but also for system-level tests as well.

Asynchronous Timing with a Clock Skew Circuit

Figure 1:
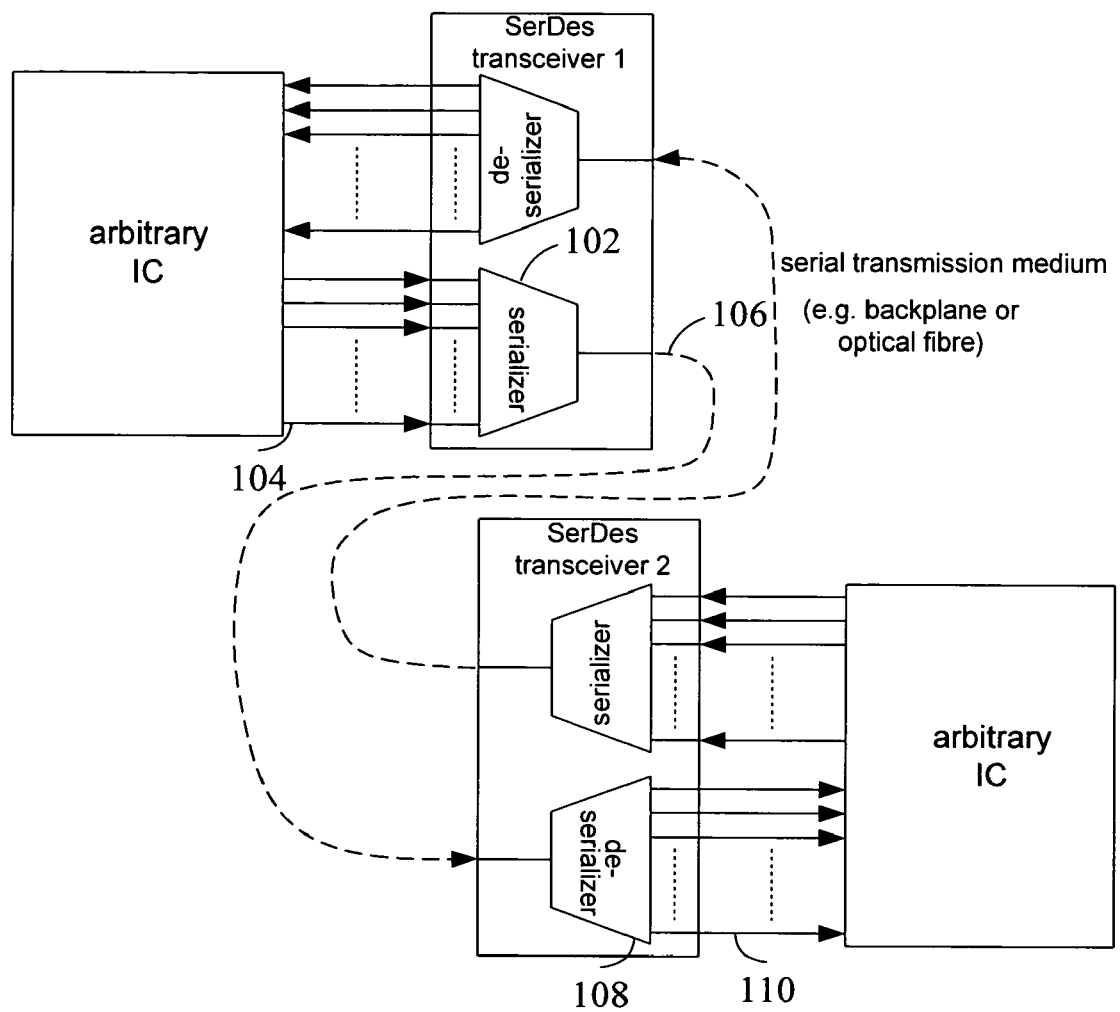
FIG. 1 illustrates an example of an application of serializer/deserializer (SerDes) devices.
Figure 2:
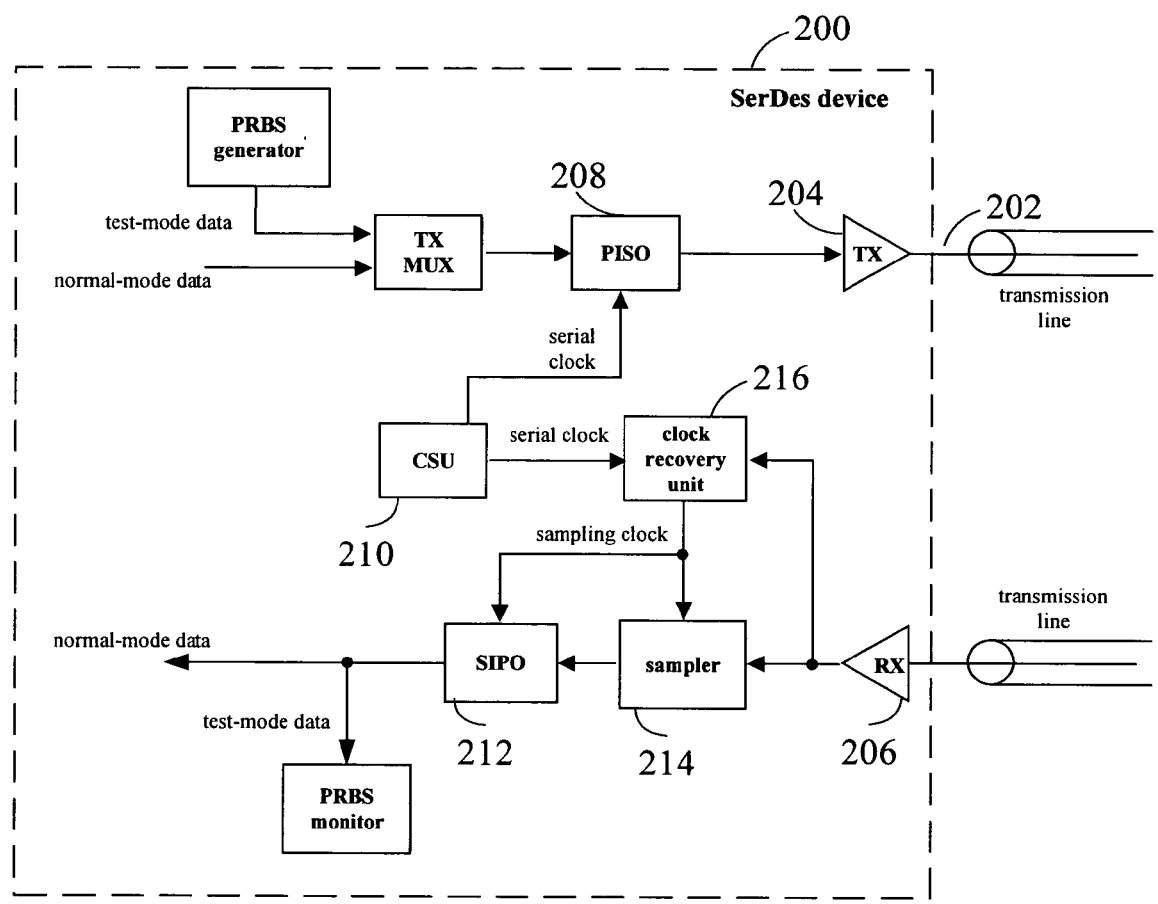
FIG. 2 illustrates a conventional serializer/deserializer (SerDes) device.
Figure 3:
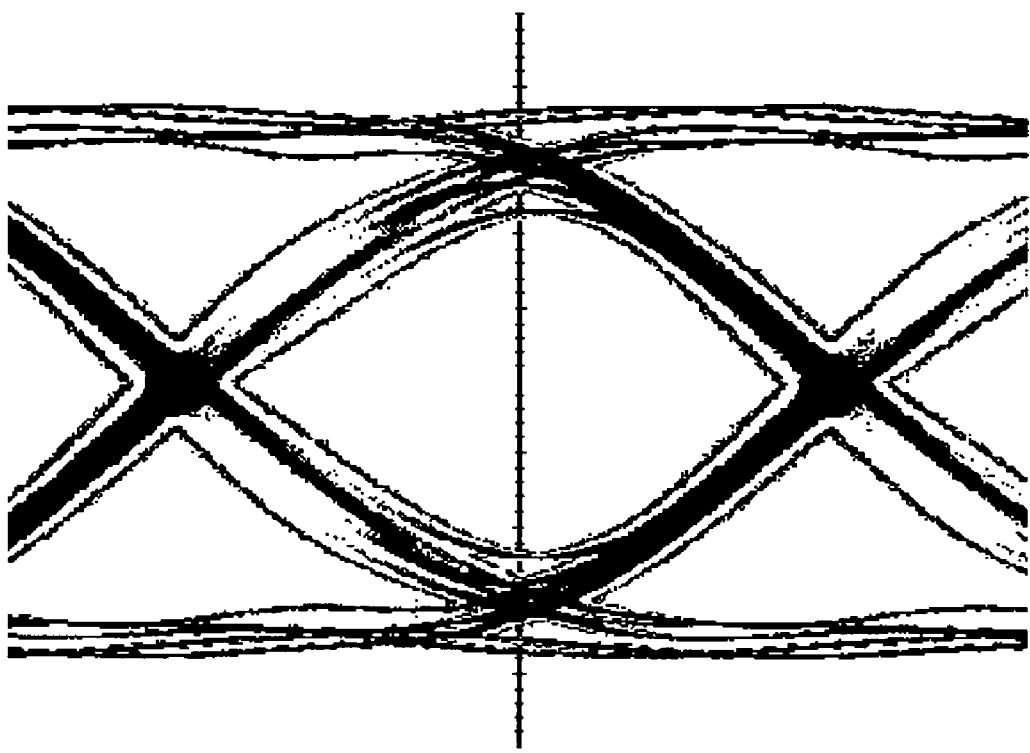
FIG. 3 illustrates an example of a data "eye" representation of digital data transitions.
Figure 4:
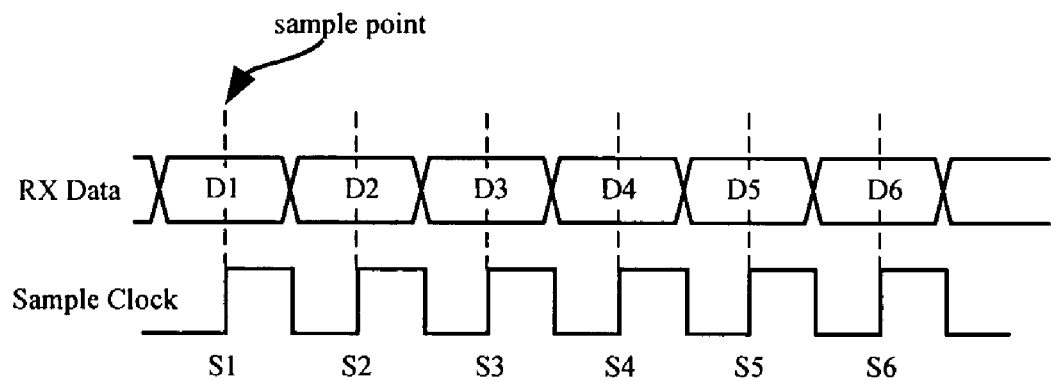
FIG. 4 illustrates an example of receive data and a relatively well-aligned sampling clock signal.
Figure 5:
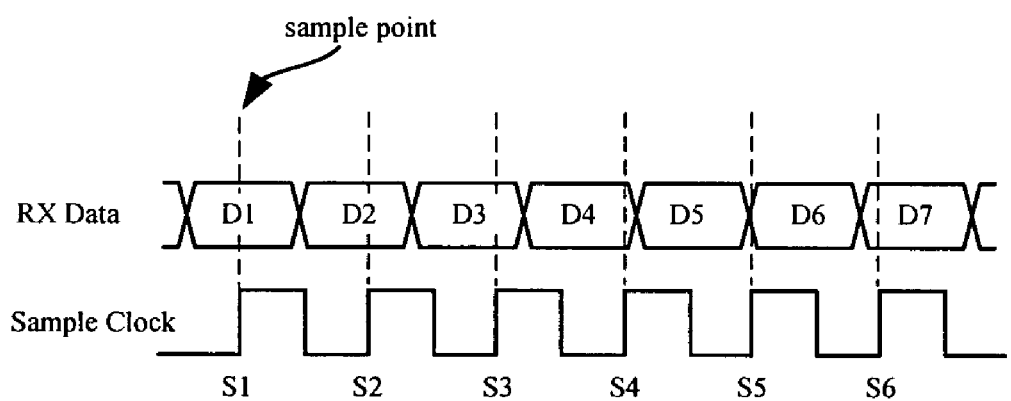
FIG. 5 illustrates an example of receive data and a relatively poorly-aligned sampling clock signal.
Figure 6:
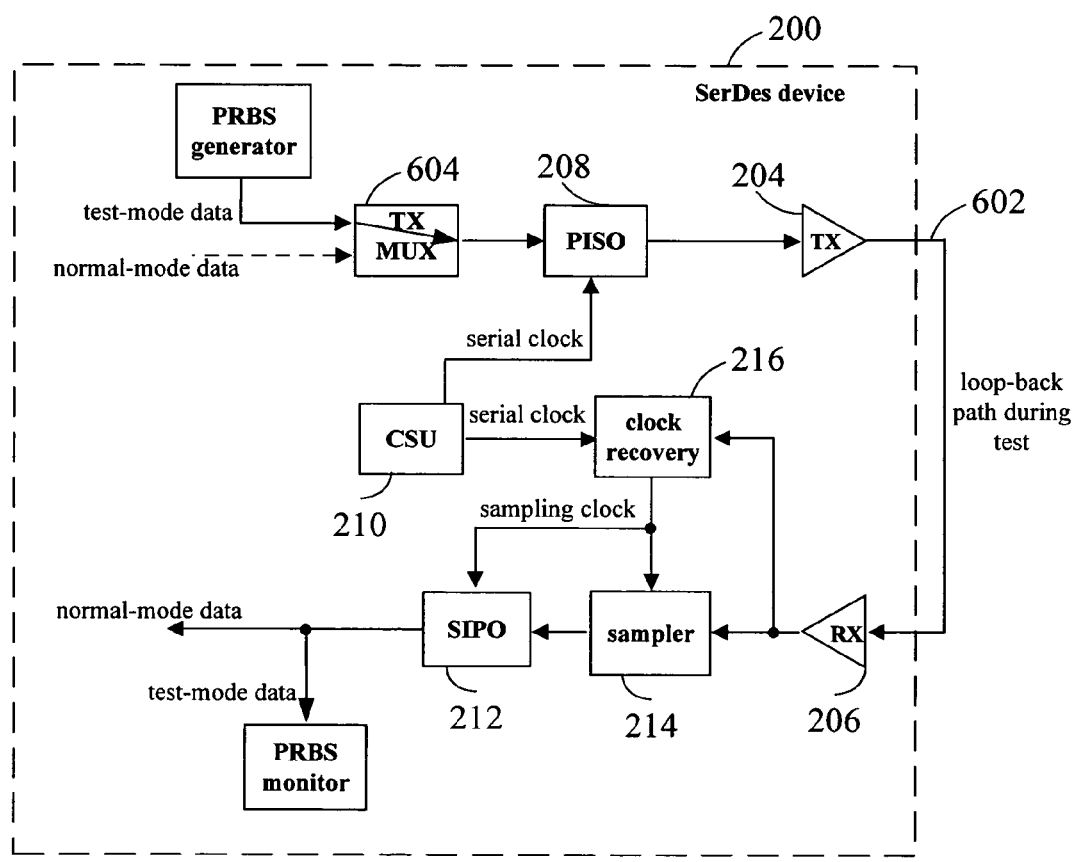
FIG. 6 illustrates a conventional SerDes device in a loopback configuration for test.
Figure 7:
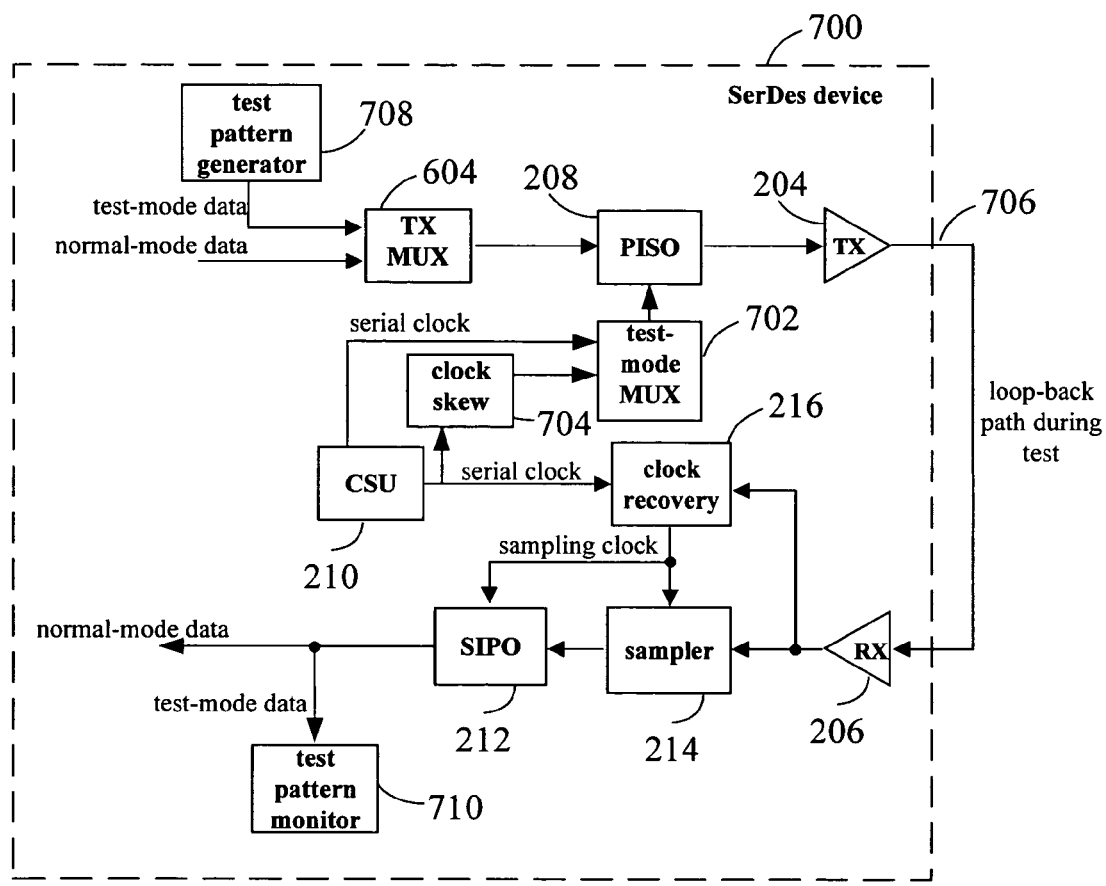
FIG. 7 illustrates a SerDes device with a test-mode multiplexer (test-mode MUX) and a clock skew circuit.

FIG. 7 illustrates a serializer/deserializer (SerDes) device 700 with a test-mode multiplexer (MUX) 702 and a clock skew circuit 704. The built-in self test (BIST) features of the illustrated SerDes device 700 vary the clock timing of the transmit data path with respect to the clock timing of the receive data path, thereby advantageously exercising frequency tracking circuitry of the receiver of the SerDes device 700 during test. For example, using a relatively simple loopback path 706 during test, the data rate of the transmitted data can be asynchronous to the clock signal generated by the clock synthesis unit (CSU) 210, thereby exercising the clock recovery unit 216. As will be explained in greater detail later, the illustrated SerDes device 700 advantageously provides this enhanced testability without increasing an amount of jitter in an output signal.

The clock skew circuit 704 modifies a serial clock signal derived from the clock synthesis unit (CSU) 210 to provide the variation in timing or asynchronous timing between the transmit data path and the serial clock signal provided to the receive data path. In the illustrated embodiment, the PISO 208 is driven by a fill-rate clock signal, and the clock skew circuit 704 and the clock recovery unit 216 are driven by a half-rate clock signal. In an embodiment that will be described later in connection with FIG. 9, independent clock synthesis units (CSUs) are used to generate asynchronous timing signals for the transmitted data and the serial clock signal provided to the receive data path.

The clock synthesis unit (CSU) 210 provides a serial clock signal to the test mode MUX 702, to the clock skew circuit 704, and to the clock recovery unit 216. In the embodiment illustrated in FIG. 7, the test-mode MUX 702 is configured to select between the serial clock signal from the clock synthesis unit (CSU) 210 for normal operation or from a clock signal from the clock skew circuit 704 for a test mode of operation. For clarity, control signals, such as control signals for the test-mode MUX 702, are not shown in FIG. 7. For example, a control input of the test-mode MUX 702 can be controlled by internal control logic or control circuit, via an external control signal from outside the device, such as from automated test equipment (ATE), and the like.

During a test mode of operation, the serial clock signal from the clock skew circuit 704 is provided to the parallel-in, serial-out (PISO) circuit 208 via the test-mode MUX 702, which decouples the transmitter clock phase from the receiver clock phase so that the transmitter data is asynchronous to the clock signal used by the clock recovery unit 216 of the receive path. The clock skew circuit 704 modifies the clock signal from the clock synthesis unit (CSU) 210 to shift the phase of the clock signal used by the parallel-in, serial-out (PISO) circuit 208 relative to the clock signal provided to the clock recovery unit 216 of the receiver. These phase shifts can be used not only to shift the phase of the skewed clock signal, but can also be used to generate frequency offsets and to induce jitter.

An example of the phase shift that can be provided by the clock skew circuit 704 will be described later in connection with FIG. 8. In one embodiment, the clock skew circuit 704 corresponds to a phase interpolator, but it will be apparent to one of ordinary skill in the art that other circuits, such as analog mixer circuits, can also be used. In one embodiment, the clock skew circuit 704 is configured to sweep the phase without bounds, i.e., over all four phase quadrants. One embodiment of the clock skew circuit 704 will be described in greater detail later in connection with FIGS. 10, 11, and 13.

FIG. 7 illustrates the SerDes device 700 in a configuration for test. The loopback path 706 operatively couples the transmitter amplifier (TX) 204 to the receiver front end (RX) 206. In the illustrated embodiment, during the test mode, test pattern data from a test pattern generator 708 is operatively coupled to the transmit path via the transmitter multiplexer (TX MUX) 604. In one embodiment, the test pattern corresponds to pseudo-random bit stream (PRBS) data. However, it will be understood that a wide variety of test patterns can be used. In addition, it will be understood that the test pattern generator 708 can be coupled to receive a clock signal based on the clock signal the clock skew circuit 704 or the test mode MUX 702. In one embodiment, the test pattern generator 708 uses a clock signal that is divided down from the clock signal used by the parallel-in, serial-out (PISO) circuit 208.

The test pattern data is received by the receiver front end (RX) 206. The clock recovery unit 216 tracks the phase of the incoming data edges received by the receiver front end (RX) 206. The clock recovery unit 216 uses both the serial clock signal from the clock synthesis unit (CSU) 210 and the incoming data from the receiver front end (RX) 206 to generate the sampling clock signal. Advantageously, during a test mode of operation, by decoupling the synchronization between the serial clock signal from the clock synthesis unit (CSU) 210 and the incoming data, the phase tracking of the clock recovery unit 216 can be exercised during test at a full data rate with relatively little test equipment.

The sampler circuit 214 determines whether the data corresponds to a logic zero or to a logic one at a time indicated by the sampling clock signal from the clock recovery unit 216. The serial-in, parallel-out (SEPO) circuit 212 converts the relatively high-rate stream of serial data from the sampler circuit 214 to a relatively slower rate of parallel data. This relatively slower rate of parallel data is provided to a test pattern monitor circuit 710, which checks the recovered data for bit errors. In one embodiment, the presence or absence of bit errors (or the frequency of the bit errors) is used to determine passing or failing for the test. As described earlier, the test pattern can correspond to pseudo-random bit stream (PRBS) data, but other data patterns can also be used, the selection of which will be readily determined by one of ordinary skill in the art based on the requirements of the device under test (DUT).

During a normal operational mode, the clock skew circuit 704 is effectively bypassed by the test-mode MUX 702, which couples the serial clock signal from the clock synthesis unit (CSU) 210 to the parallel-in, serial-out (PISO) circuit 208 for timing during the normal operational mode. By bypassing the clock skew circuit 704 with the test-mode MUX 702, undesirable jitter from the clock skew circuit 704 is advantageously not imposed on the serial clock signal used by the parallel-in, serial-out (PISO) circuit 208 during a normal operational mode, which reduces the amount of jitter in a transmitted data output signal. This provides significant performance enhancements over a configuration where, for example, the clock skew circuit 704 remains in the timing path from the clock synthesis unit (CSU) 210 to the parallel-in, serial-out (PISO) circuit 208 to the clock synthesis unit (CSU) 210 during operational mode. For example, where the clock skew circuit 704 remains in the timing path and is configured to provide zero skew, the clock skew circuit 704 can disadvantageously add significant amounts of jitter to the serial clock signal passing through. By bypassing the clock skew circuit 704, the integrity of the data during a normal operational mode is advantageously not compromised by added jitter from the clock skew circuit 704.

Figure 8:
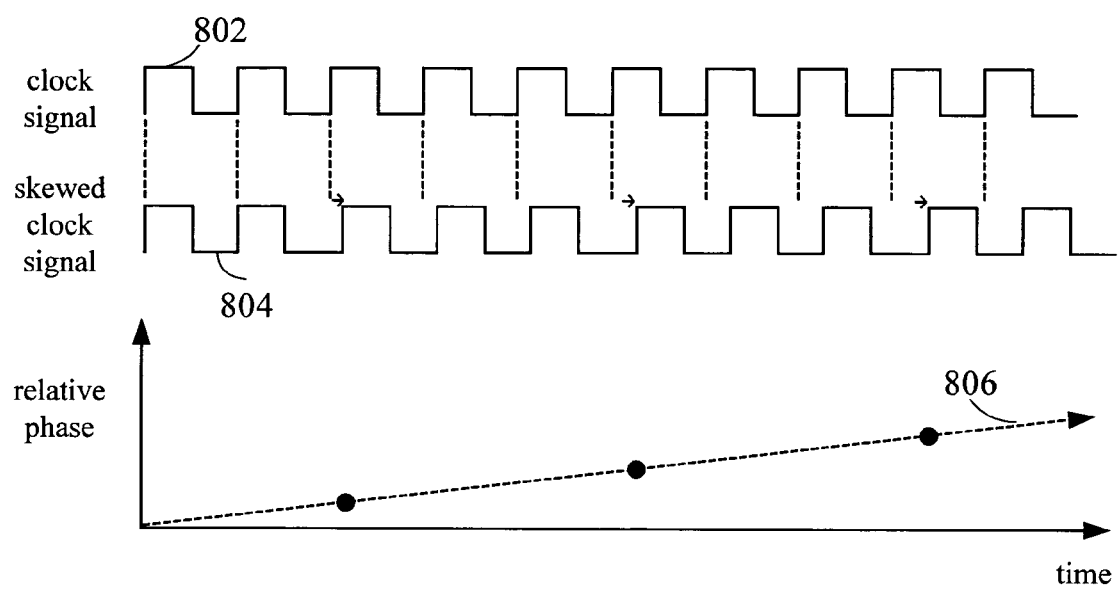
FIG. 8 illustrates a source clock signal and a skewed clock signal.

FIG. 8 illustrates an example of a source clock signal 802 and a phase-skewed clock signal 804. In the example, the phase of the skewed clock signal 804 is retarded with respect to the source clock every N cycles. It will be understood that the phase of the skewed clock signal 804 can be advanced or retarded. For the purposes of illustration, N is 3 in FIG. 8, but it will be understood that N can correspond to any integer. FIG. 8 also includes a plot of the relative phase 806 of the two illustrated clocks signals over time. In the illustrated example where a phase offset is stepped at a constant rate over time, the relative phase can be represented by kt, and where k is a constant and t represents time. For example, the source clock can be represented by $\sin(\omega t)$ with a frequency of $\omega/2\pi$, and the skewed clock can be represented by $\sin(\omega t + kt)$, with an average frequency of $(\omega+k)/2\pi$. By controlling the phase change rate of the clock skew circuit 704 at a constant rate, the clock skew circuit 704 can generate a frequency offset between the serial clock signal provided by the clock synthesis unit (CSU) 210 as an input and an output of the clock skew circuit 704.

In another example, in addition to a frequency offset as described above, an arbitrary phase selection in the clock skew circuit 704 provides timing for other useful test waveforms. During a loopback test, the receiver can be tested for functionality over any arbitrarily selected phase position of the incoming data, improving test coverage. For example, the clock skew circuit 704 can be configured or controlled so that k varies over time, and this can be used to generate jitter in the serial clock signal used for test purposes.

An Independent Clock Synthesis Unit (CSU) for Test Purposes

Figure 9:
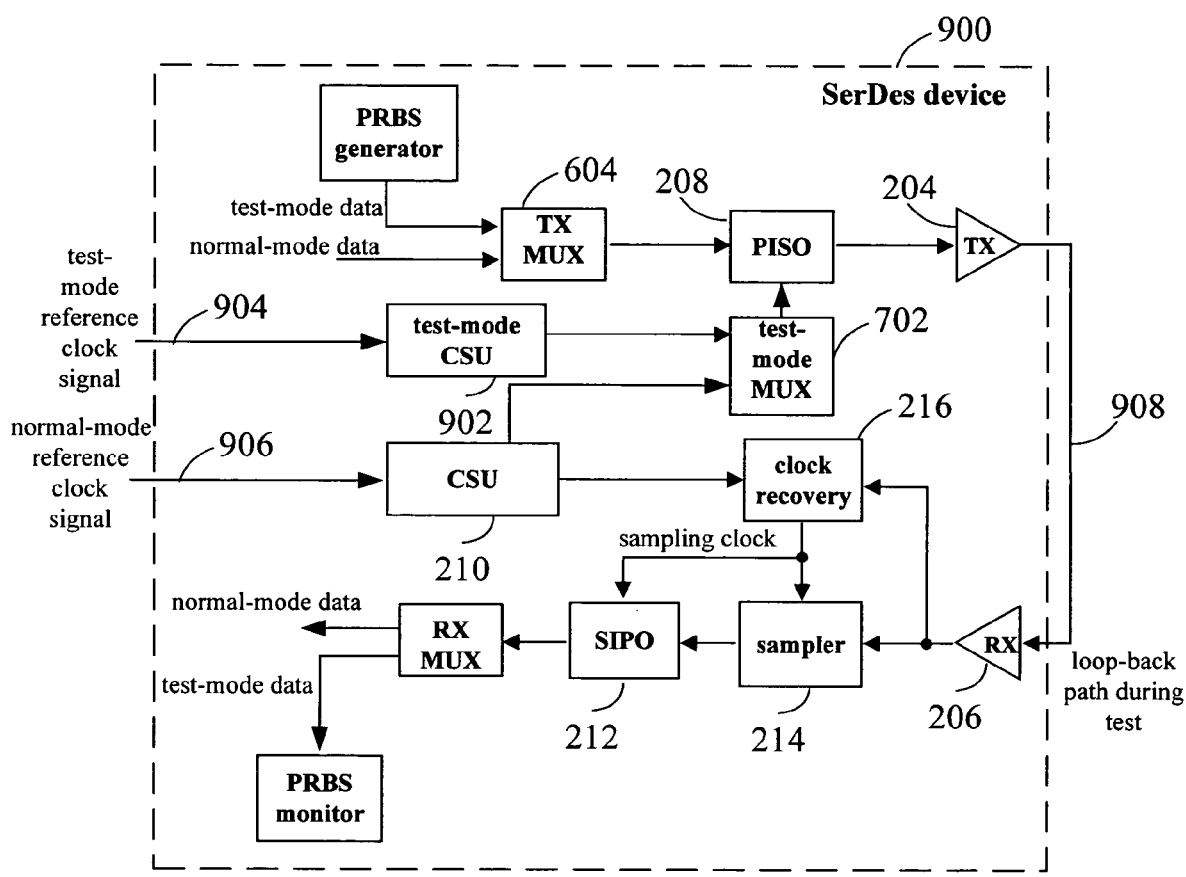
FIG. 9 illustrates a SerDes device with a test-mode multiplexer (test-mode MUX) and a test-mode clock synthesis unit (CSU).

FIG. 9 illustrates a SerDes device 900 with the test-mode MUX 702 and a test-mode clock synthesis unit (TM CSU) 902. The test-mode clock synthesis unit (TM CSU) 902 is in addition to and independent of the clock synthesis unit (CSU) 210. The test-mode clock synthesis unit (TM CSU) 902 provides the parallel-in, serial-out (PISO) circuit 208 with a serial clock signal via the test-mode MUX 702 while in a test mode. The clock synthesis unit (CSU) 210 provides a serial clock signal for the parallel-in, serial-out (PISO) circuit 208 via the test-mode MUX 702 in a normal mode, and provides a serial clock signal to the clock recovery unit 216 in both the test mode and in the normal mode.

When operating in a normal mode, the test-mode MUX 702 selects the serial clock signal from the clock synthesis unit (CSU) 210 as the clock signal provided to the parallel-in, serial-out (PISO) circuit 208. Advantageously, there is no clock skew circuit, such as a phase interpolator, in the clock signal path from the clock synthesis unit (CSU) 210 to the parallel-in, serial-out (PISO) circuit 208, and the data output of the transmitter of the SerDes device 900 exhibits relatively little jitter when transmitting data in the normal mode.

In the test-mode, the test-mode MUX 702 selects the serial clock signal from the test-mode clock synthesis unit (TM CSU) 902. A test-mode reference clock signal 904 is provided as an input to the test-mode clock synthesis unit (TM CSU) 902. The test-mode clock synthesis unit (TM CSU) 902 and the clock synthesis unit (CSU) 210 generate relatively high-speed serial clock signals from the test-mode reference clock signal 904 and the normal-mode reference clock signal 906, respectively. When the SerDes device 900 is under test by automated test equipment (ATE), the ATE provides the test-mode reference clock signal 904 and the normal-mode reference clock signal 906 as separate reference clock signals. In the test-mode, the separate reference clock signals for the test-mode clock synthesis unit (TM CSU) 902 and the clock synthesis unit (CSU) 210 provide asynchronous timing between the data provided by the transmitter of the SerDes device 900 and the clock signal used by the clock recovery unit 216. This advantageously exercises the tracking circuitry of the clock recovery unit 216 with a relatively simple loop-back path 908 from transmit data path to receive data path.

For example, to induce a phase shift on the high-speed serial clock signal that is an output of the test-mode clock synthesis unit (TM CSU) 902, the ATE provides a "phase hit" to the test-mode reference clock signal 904. After a settling time period, which varies with the amount of filtering within the test-mode clock synthesis unit (TM CSU) 902, the output phase of the test-mode clock synthesis unit (TM CSU) tracks the input phase. Advantageously, as the reference clock signals 904, 906 can be generated and controlled by the ATE, the phase hit can be programmed into the ATE software for automated test. Methods for programming phase hits into ATE signals are well known. Another way of generating asynchronous timing signals for loop-back test is to configure the ATE to use two reference clock signals 904, 906 that operate at two slightly different frequencies to provide a frequency offset.

An Embodiment of the Asynchronous BIST Circuit

Figure 10:
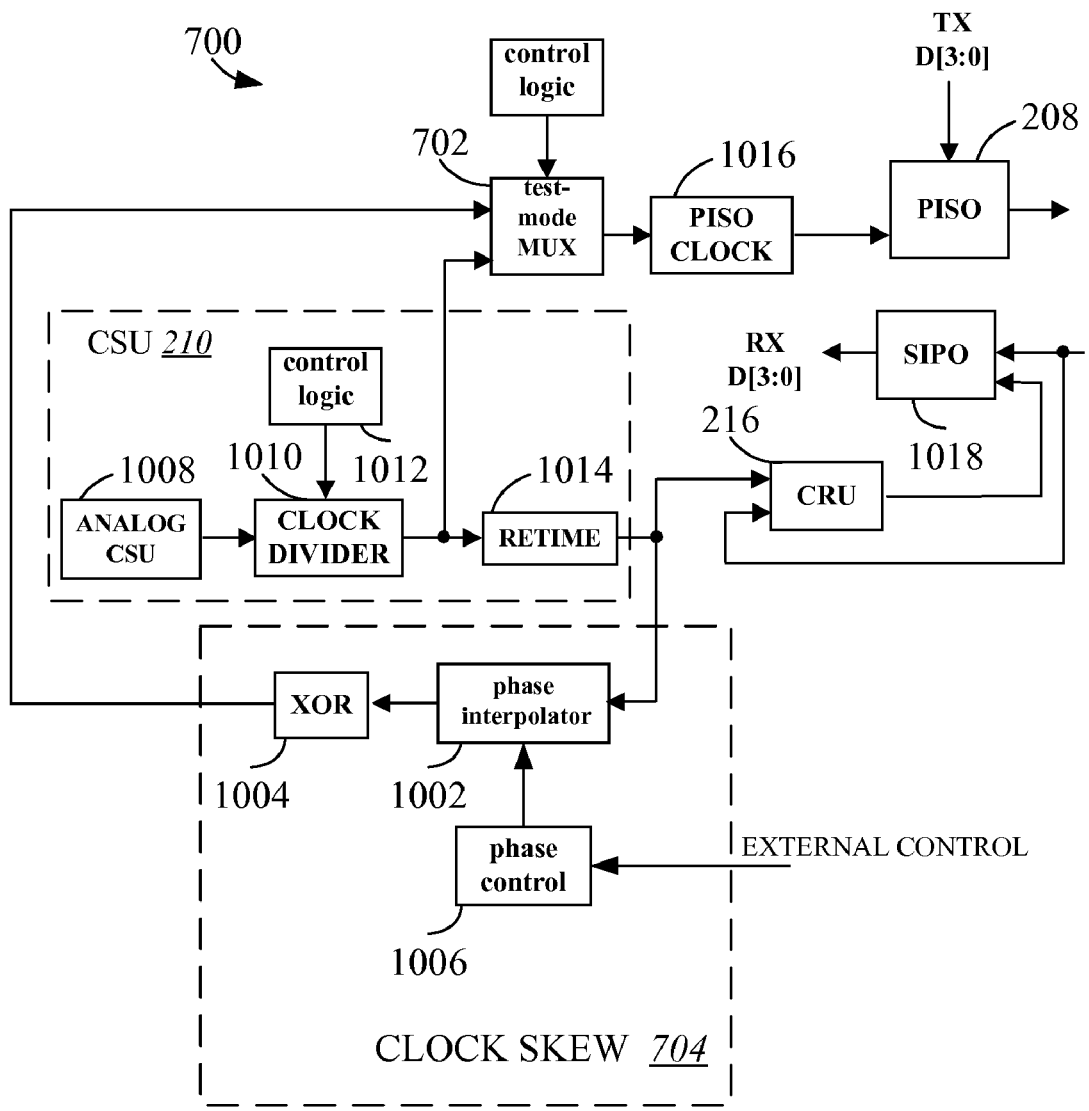
FIG. 10 illustrates further details of selected portions of a SerDes, including further details of a clock skew circuit.

FIG. 10 illustrates further details of an asynchronous built in self test (BIST) circuit embodied in a SerDes device 700. As illustrated in FIG. 10, the illustrated embodiment of the clock skew circuit 704 of FIG. 7 includes a reduced-frequency phase interpolator 1002, an exclusive-OR (XOR) gate 1004 and phase control circuitry 1006. One example of the phase interpolator 1002 will be described in greater detail later in connection with FIG. 11.

Subcircuits of one embodiment of the clock synthesis unit (CSU) 210 will now be described with reference to FIG. 10. The illustrated clock synthesis unit (CSU) 210 includes an analog clock synthesis unit (analog CSU) 1008, a clock divider circuit 1010, a control logic 1012, and a retime circuit 1014.

The analog CSU 1008 receives a relatively low frequency reference clock signal and generates a relatively high frequency serial clock signal. For example, phase-locked loop (PLL) frequency multiplication techniques can be used by the analog CSU 1008. The serial clock signal from the analog CSU 1008 is provided as an input to the clock divider circuit 1010. In the illustrated embodiment, the serial clock signal operates at full-rate. For example, for a serial data rate of 6 Giga bits per second (Gbps), the serial clock signal has a frequency of 6 GigaHertz (GHz).

The clock divider circuit 1010 receives the full-rate serial clock signal from the analog CSU 1008 as its input. The clock divider circuit 1010 selectively provides a divided-down version of the serial clock on its output. The ratio of division is controlled by the control logic 1012 and can include unity for full-rate operation. Other division ratios can also be used during test modes for functional tests. An output of the clock divider circuit 1010 is provided as an input to the test-mode MUX 702 and to the retime circuit 1014.

In the illustrated embodiment, the retime circuit 1014 corresponds to a quadrature clock generator. The retime circuit 1014 receives a clock signal from the clock divider circuit 1010. The retime circuit 1014 operates as a frequency divider and divides the clock signal by two to a half-rate clock signal and generates in-phase (I) and quadrature-phase (Q) components. It will be understood that where differential circuits are used, such as current mode logic (CML), the complements of the in-phase and quadarature-phase will also be available. The in-phase (I) and the quadrature-phase (Q) components of the half-rate clock signal are provided as inputs to the clock recovery unit (CRU) 216.

The parallel-in, serial-out (PISO) circuit 208 converts a parallel data stream into a serial data stream. In the illustrated example, a four-bit data bus is used (TX D[3:0]), but it will be understood that the data bus can be of arbitrary width. In one embodiment, the parallel-in, serial-out (PISO) circuit 208 uses several clock signals operating at various divide-down rates to clock the parallel data out serially. A PISO clock circuit 1016 generates the clock signals used by the parallel-in, serial-out (PISO) circuit 208. The PISO clock circuit 1016 is coupled to the test-mode MUX 702 and receives the selected serial clock signal. The clock signals generated by the PISO clock circuit 1016 depend on the clock signals used by the parallel-in, serial-out (PISO) circuit 208. For example, the PISO clock circuit 1016 can provide a first clock signal at a full rate and a second clock signal at one-fourth the full rate.

A serial-in, parallel-out (SIPO) circuit 1018 receives a serial data stream and converts the received data to parallel using a clock signal provided by the clock recovery unit (CRU) 216. For example, the serial-in, parallel-out (SIPO) circuit 1018 can correspond to the serial-in, parallel-out (SIPO) circuit 212 and to the sampler circuit 214 illustrated in FIGS. 2, 6, 7, and 9. The clock recovery unit (CRU) 216 monitors the data stream and uses clock signals from the retime circuit 1014. In the illustrated embodiment, the clock recovery unit (CRU) 216 uses four clock phases from the retime circuit 1014 at spacings of 0 degrees, 90 degrees, and their complements. The clock recovery unit (CRU) 216 generates a clock signal as an output, illustrated in FIGS. 2, 6, 7, and 9 as the sampling clock signal, that tracks the jitter and wander associated with receive data.

Phase Interpolator Operation

During test mode, the PISO clock circuit 1016 receives an asynchronous clock signal derived from the phase interpolator 1002 via the test-mode MUX 702. The phase interpolator 1002 uses the in-phase (I) and quadrature clocks (Q) from the retime circuit 1014. These clock signals are mixed according to control signals from the phase control circuit 1006. In one embodiment, the phase control circuit 1006 corresponds to a state machine and a DAC code circuit as will be described later in connection with FIG. 11. The phase control 1006 can also interface to an external control, such as to automated test equipment (ATE). The external control can be used to enable patterns generated by the state machine. In one embodiment, a register in the phase control 1006 is updated via the external control, and the contents of the register control a phase offset of the phase interpolator 1002. This advantageously permits control of the phase interpolator 1002 to arbitrary phase offsets, such as a phase offset used to generate a "phase hit." In one embodiment, the "phase hits" used during test are changed one step size at a time to prevent a glitch in an output of the phase interpolator 1002. For example, if glitches occur in the output of the phase interpolator 1002, such glitches can falsely cause bit errors to be observed in the receiver.

Based on the control from the phase control circuit 1006, the phase interpolator 1002 generates a phase offset on the I and Q clock signals that are provided as inputs to the XOR gate 1004, which operates as a frequency multiplier. The XOR gate 1004 combines the half-rate I and Q phases into a single asynchronous full-rate clock, thereby doubling the frequency of the half-rate clock signals. One embodiment, of the phase interpolator 1002 is described in greater detail later in connection with FIG. 11. In the phase interpolator 1002 of FIG. 11, analog mixers are used to generate the phase offsets on the I and Q clock signals. In one embodiment, identical circuits to generate phase offsets are used for the phase interpolator 1002 used and for the clock recovery unit (CRU) 216 as a design convenience. However, other architectures for generated a controlled phase offset can also be used.

Phase Interpolator Architecture

Figure 11:
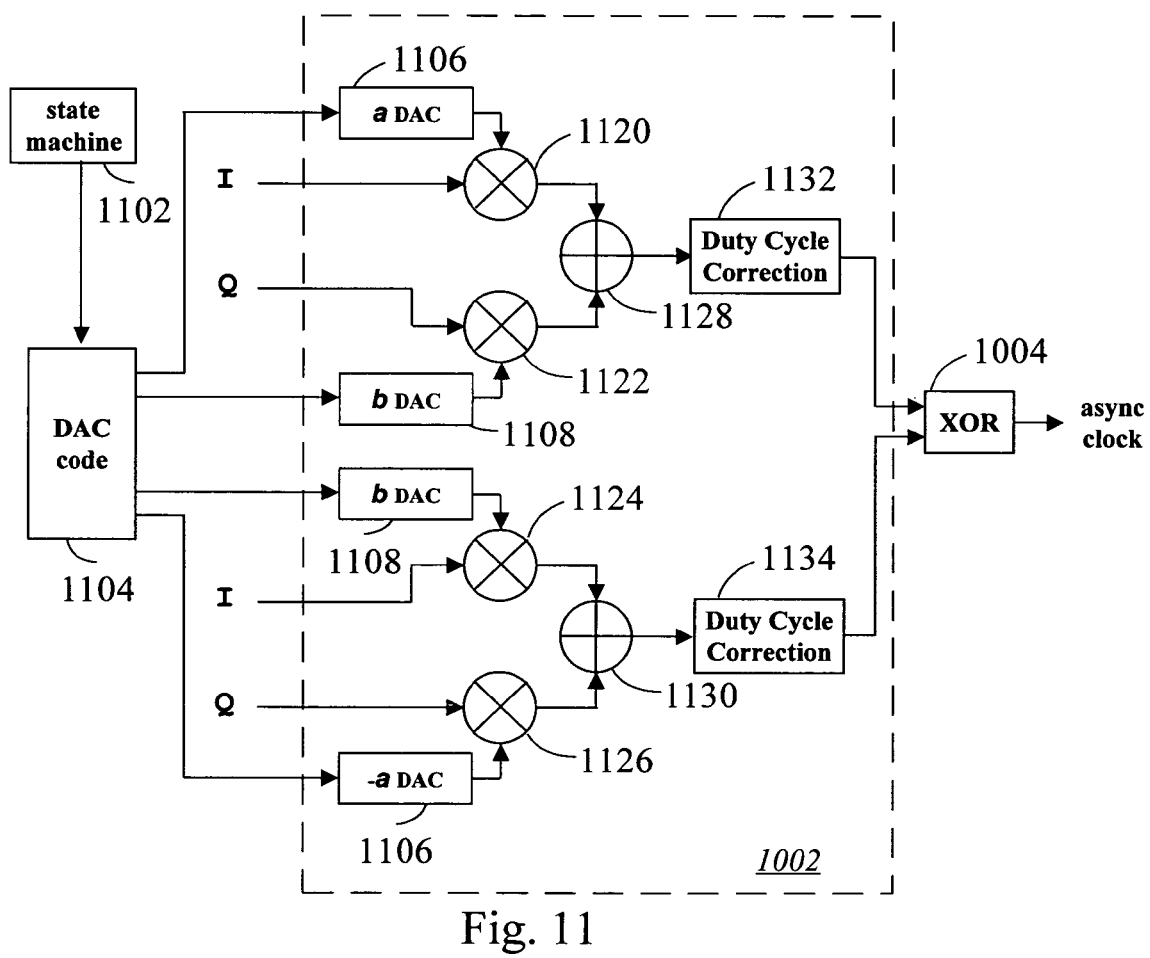
FIG. 11 illustrates further details of a phase interpolator.

FIG. 11 illustrates one embodiment of the phase interpolator 1002. The illustrated embodiment of the phase interpolator 1002 can also be referred to as a single-sideband (SSB) modulator. A state machine 1102 and a DAC code circuit 1104 correspond to the phase control circuit 1006 of FIG. 10. Operation of the state machine 1102 will be described after the description of the phase interpolator 1002. It will be understood that the phase control 1006 can be varied in a variety of ways. For example, in one embodiment, rather than use the state machine 1102, the phase control 1006 uses a lookup table to control a desired phase offset pattern, such as for a frequency offset, a jitter test pattern, and the like.

The phase interpolator 1002 includes digital-to-analog converters (DACs) 1106, 1108, mixers 1120, 1122, 1124, 1126, summing circuits 1128, 1130, and duty cycle correction circuits 1132, 1134. In one embodiment, the in-phase (I) and the quadrature-phase (Q) signals from the retime circuit 104 correspond to sinusoids, and the mixers 1120, 1122, 1124, 1126 multiply or weight the sinusoids with the outputs of the DACs 1106, 1108. For example, mixers 1120, 1122 and the summing circuit 1128 can form a first phase blender, and mixers 1124, 1126 and the summing circuit 1130 can form a second phase blender.

In the illustrated embodiment, current mode logic (CML) is used, and the outputs of retime circuit 104 and the DACs 1106, 1108 correspond to differential outputs. Accordingly, the 180-degree complements of the outputs are available, e.g., −a and +a are available from the same output by swapping differential outputs. An output of the first summing circuit 1128 corresponds to a signal with characteristic a sin x+b cos x, which is provided as an input to the duty cycle correction circuit 1132. An output of the second summing circuit 1130 corresponds to a signal with characteristic −a cos x+b sin x, which is provided as an input to the duty cycle correction circuit 1134. Vector diagrams illustrating the phase offsets provided by the phase interpolator 1002 will be described later in connection with FIG. 12.

The duty cycle correction circuits 1132, 1334 convert the analog sinusoidal waveforms from the summing circuits 1128, 1130 into binary clock signals for digital circuits. For example, the outputs of the summing circuits 1128, 1130 can exhibit direct current (DC) offsets from differential stage mismatches, buffer offsets, and the like. In the illustrated embodiment, mixers 1120, 1122, 1124, 1126 and summing circuits 1128, 1130 are used for phase blending, and duty cycle distortion manifests itself on the output of the summing circuits 1128, 1130 as a DC offset. In one embodiment, the duty cycle correction circuits 1132, 1134 correspond to high-pass filters that filter out the DC offset, thereby removing the duty cycle distortion. The binary clock signals are provided as inputs to the XOR gate 1004.

Figure 12:
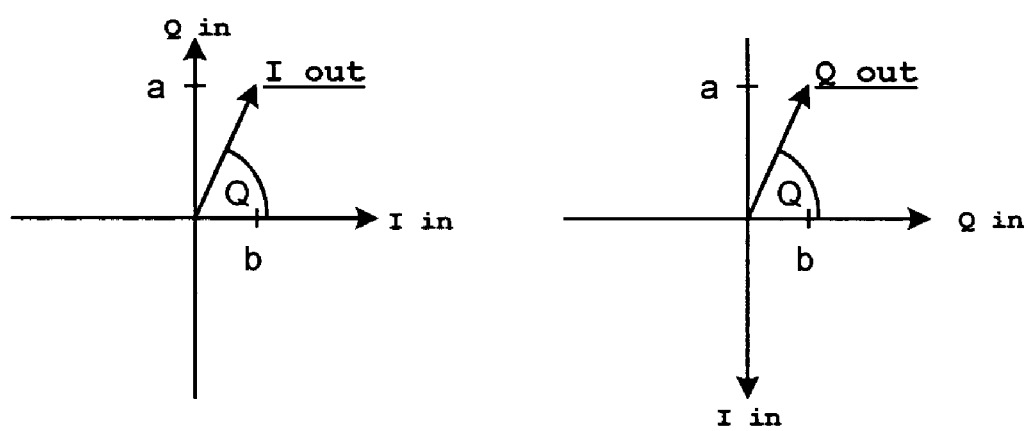
FIG. 12 illustrates vector representations of phase offsets at the outputs of the phase interpolator.

FIG. 12 illustrates vector representations of phase offsets at the outputs of the phase interpolator 1002. The sinusoidal analog signals at the inputs of the duty cycle correction circuits 1132, 1134 can be illustrated as vector quantities, where the vector angle Q, corresponds to the angle of the phase offset from sinusoidal inputs to sinusoidal outputs. FIG. 12 illustrates that by varying the a DAC and the b DAC codes, the resulting vector can be placed anywhere in the quadrant. In addition, by inverting the polarity of the DAC codes, each of the four quadrants can be selected. Also, by changing DAC codes periodically, the phase can be periodically changed, generating an asynchronous relationship between the inputs and outputs of the phase interpolator 1002.

As described earlier, in the illustrated embodiment, the state machine 1102 and the DAC code circuit 1104, and digital-to-analog converters (DACs) 1106, 1108 correspond to the phase control circuit 1006 of FIG. 10. In one embodiment, the DACs 1106, 1108 correspond to thermometer-code DACs, and the phase control circuit 1006 provides thermometer-coded control words to the DACs 1106, 1108. The use of thermometer-code DACs reduces glitches in DAC outputs. In one example, the DAC code circuit 1104 uses combinatorial logic to convert from conventional binary code to thermometer code. In another example, the DAC code circuit 1104 corresponds to a register that is updated with the appropriate thermometer code. The following state machine settings allow various levels of control over the transmitter clock during a test mode.

In the illustrated embodiment, the phase interpolator 1002 uses a half-rate clock signal and uses 64 phase steps within two-bit unit intervals (UIs) under the control of the state machine 1102 via the DAC code circuit 1104 and the DACs 1106, 1108. For example, using a phase adjustment on the serial clock signal provided to the transmitter during test, the receiver can be forced to track phase jumps on the incoming data to test receiver tracking. It should be noted that the phase jumps should be kept relatively small, such as one phase step size at a time, to prevent a temporary glitch from the phase interpolator 1002. These glitches can result in the false detection of bit errors. If larger step sizes are used and glitches are present, it will be understood that the automated test equipment (ATE) should ignore detected bit errors until stable operation is resumed. The phase adjustment can be manually controlled or under the control of the automated test equipment (ATE). Advantageously, in one embodiment, each phase step of the transmit data can be held for any length of time, allowing a stress test to be performed on the receiver over all of the receiver's 64 phase interpolator operating points. It will be understood that the number of operating points for the phase interpolator 1002 can vary in a very broad range, and that other useful numbers of operating points will be readily determined by one of ordinary skill in the art.

A frequency offset can also be generated by the phase interpolator 1002. For example, a frequency offset can be provided by stepping the phase operating point of the phase interpolator 1002 at a regular interval. To generate a positive frequency offset, the phase is stepped up. To generate a negative frequency offset, the phase is stepped down. In one embodiment, where the phase interpolator 1002 provides 32 phase operating points within one data unit interval (UI) and the maximum DAC update rate is once per fifty cycles of the half-rate clock signal processed by the phase interpolator 1002; the average frequency offset is 1/(32*200), which is about +/−156.25 parts per million (ppm).

The phase interpolator 1002 can also advantageously generate jitter waveforms for test. For example, a relatively low frequency triangle jitter waveform can be produced to test the jitter tolerance of the receiver. In one embodiment, where the phase interpolator 1002 has 64 operating points, the state machine 1102 provides a repetitive up/down ramp that steps through 128 phases (64 up and 64 down). With, for example, an update rate of 31.25 MHz and a triangle waveform of 128 phase steps, the frequency of jitter is about 244 kHz. It will be understood that the frequency of the jitter can be varied by varying the update rate of the state machine 1102. For example, to generate a lower frequency of jitter, the update rate of the state machine 1102 can be reduced. In one embodiment, the triangle waveform traverses all of the operating points of the phase interpolator 1002, such that the amplitude of the jitter is 2 unit intervals (UIs). For example, where the phase interpolator 1002 has 64 operating points, all 64 of the operating points can be traversed.

Figure 13:
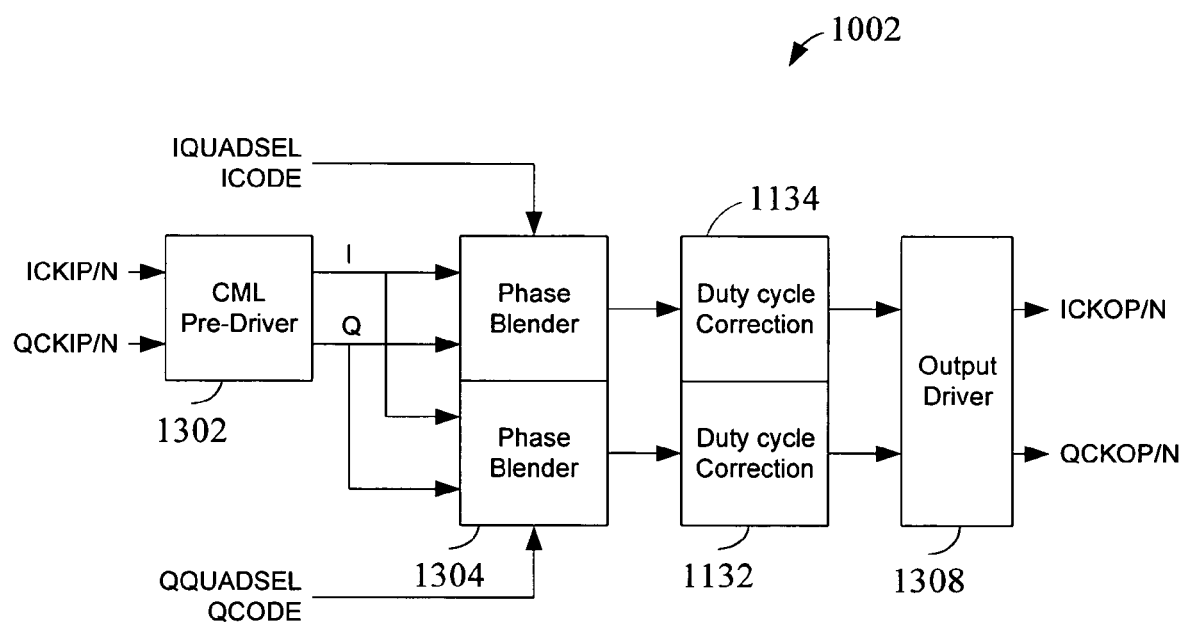
FIG. 13 illustrates another embodiment of a phase interpolator.

FIG. 13 illustrates another embodiment of the phase interpolator 1002. In the illustrated embodiment, the clock signals processed by the phase interpolator 1002 correspond to differential signals. Current mode logic pre-drivers 1302 receive in-phase (I) and quadrature-phase (Q) clock signals from the retime circuit 1014. Phase blender circuits 1304 offset the phase of the clock signals. For example, the phase blender circuits 1304 can correspond to mixers 1120, 1122, 1124, 1126 and the summing circuits 1128, 1130 described earlier in connection with FIG. 11. Duty cycle correction circuits 1132, 1134 correct for duty cycle distortion as described earlier in connection with FIG. 11. An output driver circuit 1308 provides the in-phase (I) and quadrature-phase (Q) clock signals as an output in differential form for the XOR gate 1004.

Implementing an asynchronous BIST circuit on a SerDes device provides a distinct advantage for production tests, increasing test coverage without the need to purchase expensive test equipment. Embodiments can be implemented on any integrated circuit with relatively high-speed data signals using a loop-back style of production test.

Even after a device embodying the asynchronous BIST circuit has been installed in a system, this built-in self test (BIST) can be used in system margin tests, providing a jittered signal without the need to purchase a bit error rate tester (BERT) and without the need to remove any link connections.

Experimental Results

Figure 14:
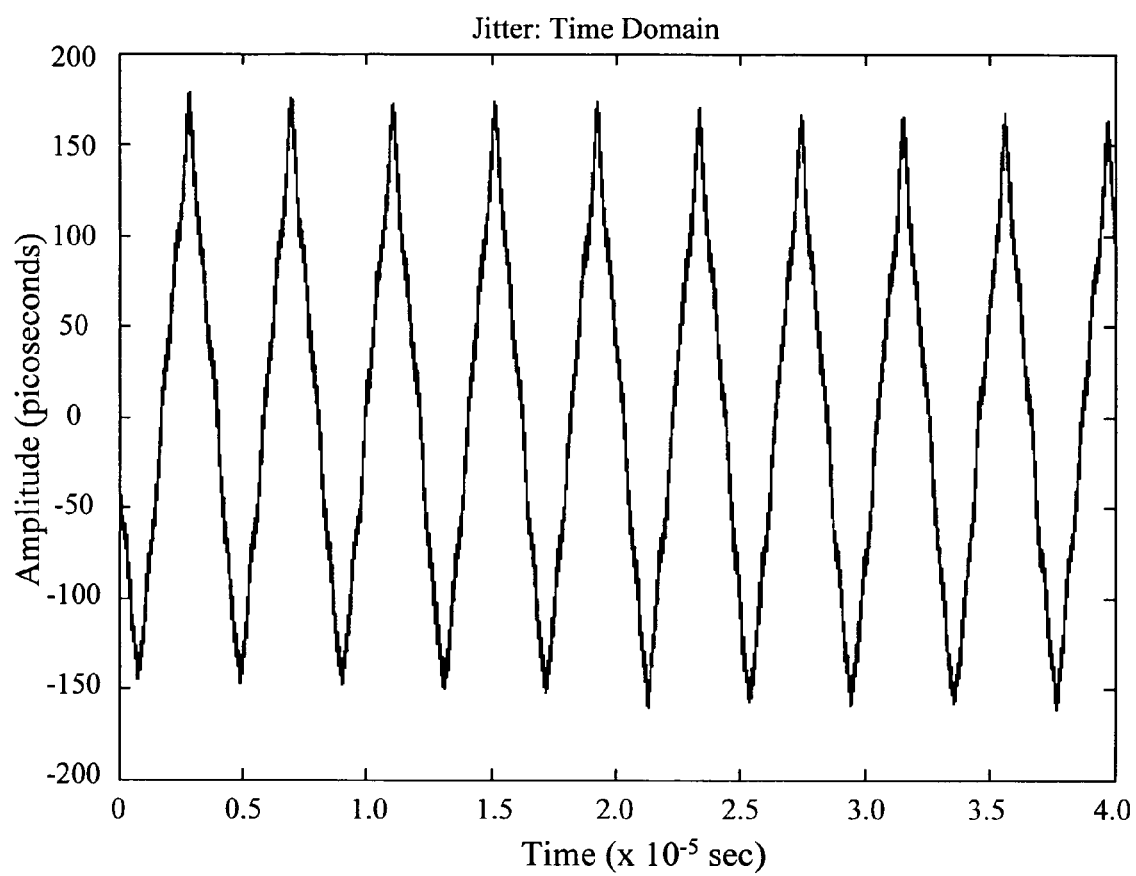
FIG. 14 illustrates experimental results of a triangle jitter waveform produced by a phase interpolator.
Figure 15:
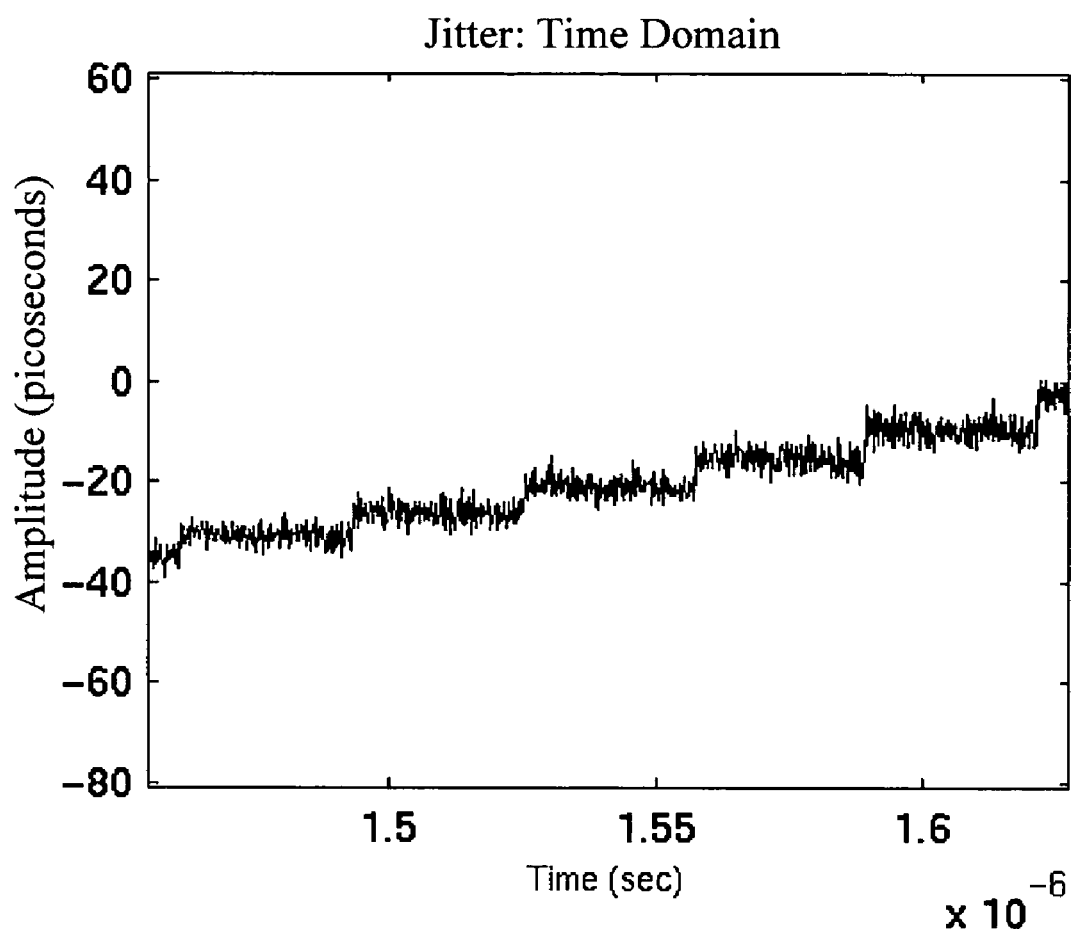
FIG. 15 illustrates the triangle jitter waveform of FIG. 14 with a smaller time scale.

FIGS. 14 and 15 illustrate experimental results of jitter performance of the phase interpolator 1002. The jitter performance of a test chip was captured with a real time oscilloscope, and the illustrated jitter was deconstructed from the captured data with software. FIG. 14 illustrates experimental results of a triangle jitter waveform produced by the phase interpolator 1002. As illustrated in FIG. 14, the amplitude of the jitter is about 320 picoseconds or 2 unit intervals (UI). FIG. 15 corresponds to the triangle jitter waveform of FIG. 14 with a smaller time scale than used in FIG. 14. These experimental results can be compared to the relative phase 806 described earlier in connection with FIG. 8.

Analog Mixer

Figure 16:
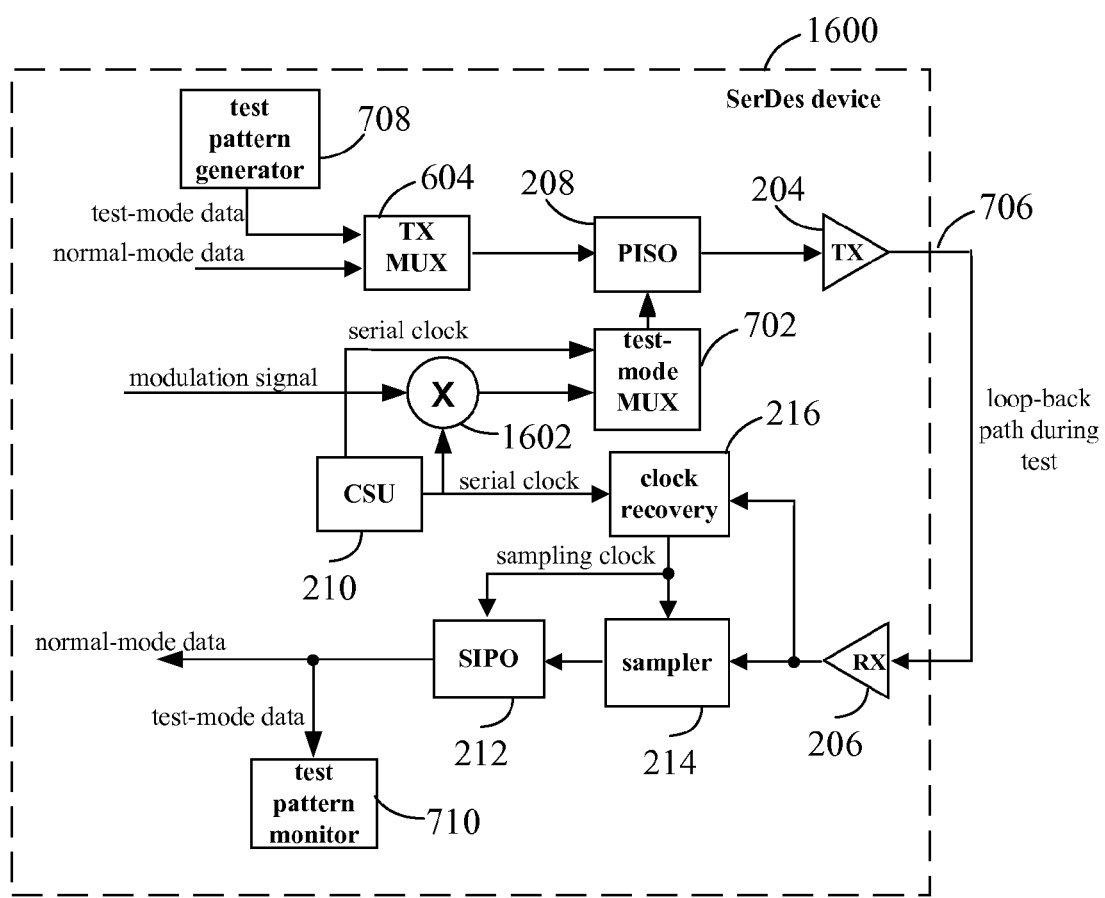
FIG. 16 illustrates a SerDes device with a test-mode multiplexer (test-mode MUX) and an analog mixer circuit.

FIG. 16 illustrates a serializer/deserializer (SerDes) device 1600 with a test-mode multiplexer (MUX) 702 and an analog mixer circuit 1602. In the illustrated embodiment, the analog mixer circuit 1602 is used for the clock skew circuit 704 of FIG. 7. See, for example, U.S. Pat. No. 5,826,182 by Gilbert. An analog mixer circuit advantageously produces a relatively more continuous phase offset. For example, analog mixers are used to multiply (mix) a radio frequency signal (RF) with a modulation signal. The output frequency is equal to sum of the frequency of the RF signal and the frequency of the modulation signal. See, for example, Eq. 1.

$$(\sin x)(\cos y)+(\cos x)(\sin y)=\sin(x+y) \quad \text{(Eq. 1)}$$

The modulation signal can be an arbitrary waveform produced either internally to the chip or externally and brought in through a test-mode pin. Having an analog mixer on the device advantageously increases the programmability of the jitter waveforms such that the device could be used as a data generator in a bit error rate tester (BERT).

Other Uses

While generally described in the foregoing in the context of a SerDes device, the principles and advantages described herein are also applicable to spread spectrum clock generation and to the reduction of simultaneous switching interference (SSI).

The clock skew circuit described in connection with FIG. 10 can be used as a spread spectrum clock generator. In a spread spectrum clock generator, the frequency of the transmit data can be changed in discrete steps by adjusting the rate at which the transmit clock phase is stepped up or down.

In another example, simultaneous switching interference (SSI) occurs when relatively many transistors switch in unison, which draws a relatively high instantaneous current for selected logic families. One technique to reduce or eliminate SSI is to use a logic family that does generates little or no SSI, such as current mode logic (CML). Where SSI is a concern, the high demand in current can reduce the quality of data transmitted and also inject noise onto other noise-sensitive circuits. On a device with relatively many transmitters, each transmitter or relatively small groups of transmitters can use a dedicated phase interpolator to stagger the switching of the transistors of the transmitters. Advantageously, this reduces the numbers of transistors which switch simultaneously, and thereby reduces SSI.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A built-in self test (BIST) circuit for a data transceiver, the BIST circuit comprising:
    a clock synthesis unit (CSU) having a first clock signal as an output;
    a parallel-in, serial-out (PISO) circuit configured to receive parallel data and to generate serial data, where a data rate of the serial data corresponds to a serial clock frequency provided to the PISO circuit via a clock signal input;
    a multiplexer having at least a first input, a second input, and an output, where the first input is coupled to the first clock signal from the clock synthesis unit (CSU), where the second input is coupled to a second clock signal from an asynchronous clock source, where the output of the multiplexer is coupled to the clock signal input of the PISO circuit, where the multiplexer provides the first input to the clock signal input of the PISO circuit when the data transceiver is in a normal mode and provides the second input to the clock signal input of the PISO circuit when the data transceiver is in a test mode.

2. The BIST circuit as defined in claim 1, wherein the asynchronous clock source comprises a phase interpolator coupled to the first clock signal, where a control signal to the phase interpolator changes a phase offset between the second clock signal and the first clock signal.

3. The BIST circuit as defined in claim 2, wherein the phase interpolator further comprises:
    a first mixer with inputs coupled to a first phase of the first clock signal and to a first weight;
    a second mixer with inputs coupled to a second phase of the first clock signal and to a second weight;
    a first summing circuit with inputs coupled to outputs of the first mixer and the second mixer;
    a first duty cycle correction circuit with an input coupled to an output of the first summing circuit;
    a third mixer with inputs coupled to the first phase of the first clock signal and to the second weight;
    a fourth mixer with inputs coupled to the second phase of the first clock signal and to a complement of the first weight;
    a second summing circuit with inputs coupled to outputs of the third mixer and the fourth mixer; and
    a second duty cycle correction circuit with an input coupled to an output of the second summing circuit.

4. The BIST circuit as defined in claim 3, wherein the first duty cycle correction circuit and the second duty cycle correction circuit comprise high-pass filter circuits that remove direct current (DC) offsets.

5. The BIST circuit as defined in claim 3, further comprising digital-to-analog converters having the first weight and the second weight as outputs.

6. The BIST circuit as defined in claim 5, wherein the digital-to-analog converters correspond to thermometer-code digital-to-analog converters.

7. The BIST circuit as defined in claim 5, further comprising a state machine operatively coupled to inputs of the digital-to-analog converters for control, wherein the state machine is configured to control the first weight and the second weight of the digital-to-analog converters in a predetermined pattern.

8. The BIST circuit as defined in claim 5, further comprising an external interface operatively coupled to control inputs of the digital-to-analog converters such that the first weight and the second weight of the digital-to-analog converters are selectable under external control.

9. The BIST circuit as defined in claim 3, wherein the BIST circuit is embodied in a serializer/deserializer (SerDes) device.

10. The BIST circuit as defined in claim 1, wherein the asynchronous clock source further comprises a reduced-frequency phase interpolator and a frequency multiplier, where an input of the reduced-frequency phase interpolator is coupled to the first clock signal, which is of a lower frequency than the serial clock frequency provided to the PISO circuit, where an input of the frequency multiplier is coupled to an output of the reduced-frequency phase interpolator, and where an output of the frequency multiplier provides the second clock signal.

11. The BIST circuit as defined in claim 10, wherein the frequency multiplier corresponds to an exclusive-OR (XOR) gate.

12. The BIST circuit as defined in claim 1, wherein the asynchronous clock source comprises an analog mixer coupled to the first clock signal and to a modulation signal, where the analog mixer is configured to multiply the first clock signal and the modulation signal to generate the second clock signal.

13. The BIST circuit as defined in claim 1, wherein the asynchronous clock source comprises a second clock synthesis unit that is configured to generate the second clock signal from a test-mode reference clock signal.

14. The BIST circuit as defined in claim 1, further comprising a clock recovery unit coupled to a data stream received in a receiver of the data transceiver and coupled to a clock signal from the clock synthesis unit (CSU), wherein the clock recovery unit is configured to track the data stream and generate a sampling clock signal.

15. The BIST circuit as defined in claim 1, wherein the BIST circuit is embodied in a serializer/deserializer (SerDes) device.

16. A method in a data transceiver of testing tracking of a receiver, the method comprising:
   in a normal mode, referencing timing of data bits of an output of a transmitter of the data transceiver to a first clock signal;
   in a test mode, referencing timing of the data bits of the output of the transmitter to a second clock signal, where the second clock signal is asynchronous to the first clock signal;
   looping back the output of the transmitter to the receiver;
   using a third clock signal that is synchronous to the first clock signal and asynchronous to the second clock signal as a timing reference for the receiver;
   monitoring an output of the receiver for bit errors;
   providing the first clock signal and the second clock signal as inputs to a multiplexer;
   coupling an output of the multiplexer to the transmitter of the data transceiver,
   where the output of the multiplexer is used by the transmitter as the timing reference;
   selecting the first clock signal as the output of the multiplexer in the normal mode; and
   selecting the second clock signal as the output of the multiplexer in the test mode.

17. The method as defined in claim 16, wherein the third clock signal is derived from the first clock signal.

18. The method as defined in claim 16, wherein the third clock signal is divided by two from the first clock signal.

19. The method as defined in claim 16, wherein the third clock signal and the first clock signal are the same.

20. The method as defined in claim 16, further comprising generating the second clock signal from the first clock signal with a phase interpolator.

21. The method as defined in claim 20, further comprising:
   frequency dividing the first clock signal;
   providing the frequency divided first clock signal as an input to the phase interpolator;
   operating the phase interpolator at a substantially lower frequency than either the first clock signal or the second clock signal; and
   frequency multiplying an output of the phase interpolator to generate the second clock signal.

22. The method as defined in claim 21, further comprising using an exclusive-OR (XOR) gate to frequency multiply the output of the phase interpolator.

23. The method as defined in claim 16, further comprising generating the second clock signal from the first clock signal with an analog mixer.

24. The method as defined in claim 16, wherein the second clock signal is frequency offset from the first clock signal.

25. The method as defined in claim 16, wherein the second clock signal is repeatedly phase offset from the first clock signal to generate a jitter pattern between the second clock signal and the first clock signal.

26. The method as defined in claim 16, further comprising generating the first clock signal and the second clock signal from separate clock synthesizer units (CSUs).

27. The method as defined in claim 16, wherein the data transceiver is embodied in a serializer/deserializer (SerDes) device.

* * * * *